(12) United States Patent
Lee et al.

(10) Patent No.: US 11,814,480 B2
(45) Date of Patent: Nov. 14, 2023

(54) METHOD FOR PRODUCING POLYAMIDE WITH CONTROLLED ACTIVATOR ADDITION, AND POLYAMIDE PRODUCED THEREBY

(71) Applicant: HANWHA CHEMICAL CORPORATION, Seoul (KR)

(72) Inventors: Hye Yeon Lee, Seoul (KR); Do Kyoung Kim, Busan (KR); Seung Hoe Do, Daejeon (KR); Jin Seo Lee, Seongnam-si (KR); Kyung Ho Kwon, Daegu (KR); Dae Hak Kim, Seongnam-si (KR); Kyoung Won Yim, Gwangju (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 363 days.

(21) Appl. No.: 16/763,793

(22) PCT Filed: Oct. 29, 2018

(86) PCT No.: PCT/KR2018/012938
§ 371 (c)(1),
(2) Date: May 13, 2020

(87) PCT Pub. No.: WO2019/098569
PCT Pub. Date: May 23, 2019

(65) Prior Publication Data
US 2020/0277438 A1 Sep. 3, 2020

(30) Foreign Application Priority Data
Nov. 14, 2017 (KR) .................. 10-2017-0151495

(51) Int. Cl.
*C08G 69/18* (2006.01)
*C08G 69/14* (2006.01)

(52) U.S. Cl.
CPC ............ *C08G 69/18* (2013.01); *C08G 69/14* (2013.01); *C08J 2377/02* (2013.01)

(58) Field of Classification Search
CPC ........... C08F 2/38; C08G 69/18; C08G 69/14; C08L 77/02; C09D 177/02
See application file for complete search history.

(56) References Cited

U.S. PATENT DOCUMENTS

| | | | |
|---|---|---|---|
| 3,423,372 A | 1/1969 | Steely | |
| 3,721,652 A * | 3/1973 | Barnes | C08G 69/24 528/319 |
| 3,878,173 A | 4/1975 | Biensan et al. | |
| 4,067,861 A | 1/1978 | Biensan et al. | |
| 4,393,193 A * | 7/1983 | Hartmann | C08G 69/18 528/323 |
| 4,435,547 A * | 3/1984 | Woo | C08L 77/02 525/419 |
| 4,611,052 A | 9/1986 | Vrinssen et al. | |
| 4,754,000 A | 6/1988 | Meyer et al. | |
| 5,747,634 A | 5/1998 | Schmid et al. | |
| 6,579,965 B2 | 6/2003 | Hoogen et al. | |
| 6,627,726 B1 | 9/2003 | Bruchmann et al. | |
| 6,713,596 B1 | 3/2004 | Faulhammer et al. | |
| 8,124,686 B2 | 2/2012 | Loyen et al. | |
| 9,617,384 B2 | 4/2017 | Senff | |
| 9,657,138 B2 | 5/2017 | Lee et al. | |
| 10,676,569 B2 | 6/2020 | Clauss et al. | |
| 2002/0161167 A1* | 10/2002 | Hoogen | C08G 69/18 528/310 |
| 2005/0197446 A1 | 9/2005 | Loyen et al. | |
| 2010/0098880 A1 | 4/2010 | Senff | |
| 2010/0113661 A1 | 5/2010 | Senff et al. | |
| 2016/0130397 A1 | 5/2016 | Clauss et al. | |
| 2016/0297930 A1 | 10/2016 | Lee et al. | |

FOREIGN PATENT DOCUMENTS

| | | |
|---|---|---|
| EP | 0 156 129 A1 | 10/1985 |
| EP | 1 091 991 B1 | 11/2003 |
| EP | 1 571 173 A1 | 9/2005 |
| JP | 6-116385 A | 4/1994 |
| JP | 2010-514876 A | 5/2010 |
| JP | 2010-514877 A | 5/2010 |
| JP | 2012-017476 A | 1/2012 |
| KR | 10-0322263 B1 | 2/2002 |
| KR | 10-1349063 B1 | 1/2014 |
| KR | 10-1533891 B1 | 7/2015 |
| KR | 10-2016-0020485 A | 2/2016 |

(Continued)

OTHER PUBLICATIONS

A. Wollny et al., "In situ Formation and Compounding of Polyamide 12 by Reactive Extrusion", Journal of Applied Polymer Science, Formation of Polyamide 12 by Reactive Extrusion vol. 90, 2003, pp. 344-351 (8 pages total).
International Search Report for PCT/KR2018/012938 dated Feb. 1, 2019 [PCT/ISA/210].
Stanislaw Chrzczonowicz et al., "Polymerization of ε-caprolactam and ζ-enantholactam in non-polar solvents", Die Makromolekulare Chemie, Department of Organic Technology, Laboratory of Plastics Technology, Jan. 1960, pp. 159-167.

*Primary Examiner* — Gregory Listvoyb
(74) *Attorney, Agent, or Firm* — Sughrue Mion, PLLC

(57) ABSTRACT

The present invention provides a method for producing a polyamide with controlled activator addition, and a polyamide produced thereby, the method allowing a polymerization conversion rate and a polydispersity index (PDI) to be enhanced by controlling the addition of an activator so as to prevent a gelation phenomenon that occurs during anionic polymerization.

13 Claims, 2 Drawing Sheets

(56) References Cited

FOREIGN PATENT DOCUMENTS

| KR | 10-2016-0037692 A | 4/2016 |
| KR | 10-2016-0083649 A | 7/2016 |

* cited by examiner

METHOD FOR PRODUCING POLYAMIDE WITH CONTROLLED ACTIVATOR ADDITION, AND POLYAMIDE PRODUCED THEREBY

CROSS REFERENCE TO RELATED APPLICATIONS

This application is a National Stage of International Application No. PCT/KR2018/012938 filed Oct. 29, 2018, claiming priority based on Korean Patent Application No. 10-2017-0151495 filed Nov. 14, 2017.

TECHNICAL FIELD

The present invention relates to a method for producing a polyamide with controlled activator addition, and a polyamide produced thereby, and more particularly, to a method for producing a polyamide with controlled activator addition, and a polyamide produced thereby, the method allowing a polymerization conversion rate and a polydispersity index (PDI) to be enhanced by controlling the addition of an activator so as to prevent a gelation phenomenon that occurs during anionic polymerization.

BACKGROUND ART

A polyamide resin is a linear polymer bonded by an amide (—NHCO—) bond. The polyamide resin is strong, has excellent physical properties in terms of friction resistance, abrasion resistance, oil resistance, and solvent resistance, and is easily melt-molded. Therefore, the polyamide resin is widely used as clothing materials, fibers for industrial materials, engineering plastics, and the like. Polyamides may be classified into aliphatic polyamides, aromatic polyamides, and aliphatic cyclic polyamides according to molecular structures. The aliphatic polyamides may be collectively referred to as nylon, and the aromatic polyamides may be collectively referred to as aramid.

Polyamides are produced by various polymerization methods and may be classified into those produced by ring-opening polymerization of lactam, such as nylon 6, those produced by polycondensation of diamines and dibasic acids, such as nylon 6,6, nylon 6.10 and nylon 4,6, and those produced by polycondensation of aminocarboxylic acids, such as nylon 11 and nylon 12. Furthermore, so-called hybrid polymerized nylons, such as hybrid condensates of caprolactam and 6,10-nylon salts (hexamethylenediamine and sebacate), are industrially produced, and various polyamides including functional groups such as side chains and hydroxyl groups, aromatic rings and, hetero rings in molecules have been studied.

Lactams, for example, caprolactam may be anionically polymerized. This method generally uses a catalyst and an initiator (also referred to as an activator) (activated anionic polymerization). Initiators or activators frequently used till now include diisocyanates or derivatives thereof.

U.S. Pat. No. 4,754,000 (Bayer AG) discloses activated anionic polymerization of lactams, which produces polyamides using biuret-group-containing polyisocyanates derived from non-aromatic diisocyanates as an activator.

EP 1091991 (BASF AG) discloses a composition including polyisocyanurates having more than 3.5 NCO functional groups on average as a component A and a method for producing a surface coating composition using the composition.

In U.S. Pat. No. 3,423,372, uncapped polyisocyanates are used (resulting in a significant reduction in reactivity), and an activator concentration in that example is very low (1/200 mol to 1/50 mol). Polymerization takes more than 3 minutes at the concentration used in this US patent.

In EP 0156129, a rubber (i.e., elastomer) is used as a precursor of a multifunctional activator. Therefore, the resulting PA is up to 1.12 GPa and is not rigid. The activator has a high weight average molecular weight (Mw). In this case, a large amount of activator is required (20% or more). A mixture of a bifunctional activator and a multifunctional activator is used. Therefore, the resulting polyamide is not a crosslinked material.

In addition, U.S. Pat. No. 4,067,861 (1978) discloses a technology for anionic polymerization of lactams through an extruder. A metering pump is installed between an extruder body and an extruder die so as to obtain a constant output and uniform viscosity and physical properties. Although attempting to mechanically solve viscosity non-uniformity, this is not a fundamental solution.

U.S. Pat. No. 3,878,173 (1975) points out the problem of unstable viscosity due to thermal decomposition and the formation of a structurally disorderly branching structure. However, in order to prevent decomposition of a synthesized polymer, an attempt to solve the problem is made just by using a more acidic additive. This US patent does not disclose the solution to the non-uniform branching structure. For reference, a branching side reaction that occurs during polyamide anion polymerization is discussed in detail in M. P. Stevens, "Polymer Chemistry", 2nd Ed., Oxford University Press, p 429 (1990) and G. Odian, "Principles of Polymerization", 2nd Ed., John Wiley & Sons, p 541 (1981).

In particular, in U.S. Pat. No. 5,747,634 (1998), a solution liquid system containing a catalyst and an initiator (reaction accelerator) at the same time is introduced so as to obtain a more uniform product. U.S. Pat. No. 5,747,634 discloses that the solution liquid system is introduced to obtain uniform products with a constant quality and a high reproducibility result, but there is a problem that is not efficient due to a problem of solvent removal when applying to a reaction extrusion method.

Furthermore, in the conventional anionic polymerization, a reaction rate is fast due to a small molecular size in a process of adding an activator, but gelation occurs when an excessive amount is added at one time.

PRIOR ART DOCUMENTS (Patent Document 1) U.S. Pat. No. 6,713,596 B1
(Patent Document 2) Korean Patent Registration No. 10-1533891
(Patent Document 3) Korean Patent Registration No. 10-1349063
(Patent Document 4) Korean Patent Registration No. 10-0322263
(Non-Patent Document 5) METHOD FOR ANIONIC POLYMERIZATION OF LACTAMS(Atofina) J. Applied Polymer Science, 2003, 90, 344-351, In-situ Formation and Compounding of Polyamide 12 by Reactive Extrusion

DESCRIPTION OF EMBODIMENTS

Technical Problem

The present invention aims to solve the above-described problems of the related art and the technical problems requested from the past.

An object of the present invention is to provide a method for producing a polyamide with controlled activator addition, and a polyamide produced thereby, the method allowing a polymerization conversion rate and a polydispersity index (PDI) to be enhanced by controlling the addition of an activator so as to prevent a gelation phenomenon that occurs during anionic polymerization.

Another object of the present invention is to provide a method for producing a polyamide with controlled activator addition, and a polyamide produced thereby, wherein the method is an eco-friendly processing method that does not generate by-products and does not use a solvent as a catalyst, and enables polymerization to a uniform molecular weight with a high conversion rate in a short polymerization reaction time at a low temperature, compared with an existing polymerization method.

Solution to Problem

To achieve the object, a method for producing a polyamide with controlled activator addition according to the present invention is a method for producing a polyamide with controlled activator addition through an anionic polymerization reaction, wherein lactam, and based on 100 parts by weight of the entire lactam, 0.01 parts by weight to 20 parts by weight of an alkali metal as an initiator, 0.3 parts by weight to 10 parts by weight of a molecular weight controller, and 0.002 parts by weight to 7.0 part by weight of an activator are included, and the activator is injected by adjusting an addition amount at an interval of at least twice.

In a preferred embodiment of the present invention, an addition interval of the activator may be within 1 minutes to 10 minutes.

In a preferred embodiment of the present invention, an amount of the activator added once may be within a range of 0.002 parts by weight to 7.0 parts by weight.

In a preferred embodiment of the present invention, the activator may include at least one selected from the group consisting of carbon dioxide ($CO_2$), benzoyl chloride, N-acetyl caprolactam, N-acetyl laurolactam, octadecyl isocyanate (SIC), toluene diisocyanate (TDI), hexamethylene diisocyanate (HDI), and any mixture thereof.

In a preferred embodiment of the present invention, the activator may be injected in a spraying method using a sparger.

In a preferred embodiment of the present invention, the activator may be injected into a polymer.

In a preferred embodiment of the present invention, the activator may be injected by being sprayed onto the upper portion of the polymer, that is, the surface thereof.

In a preferred embodiment of the present invention, an addition rate of the activator may be within a range of 0.00) L/min to 10 L/min with respect to a volume (1 $m^3$) of a reactor.

In a preferred embodiment of the present invention, the alkali metal may include at least one selected from the group consisting of metal hydride, metal hydroxide, and metal alkoxide.

In a preferred embodiment of the present invention, the polymerization reaction may be performed within a range of 0.5 minutes to 120 minutes. The polymerization reaction is not particularly limited and may be appropriately adjusted according to a weight of a compound added or a size and a type of the reactor.

In a preferred embodiment of the present invention, the lactam in the polymerization reaction may have a conversion rate of 95% or more.

In a preferred embodiment of the present invention, the polymerization reaction may be performed within a range of 180° C. to 300° C.

The present invention provides a polyamide produced by the method described above.

In a preferred embodiment of the present invention, the polyamide may have a polydispersity index (PDI) of 3.0 or less.

In a preferred embodiment of the present invention, a weight average molecular weight (Mw) of the polyamide may be in a range of 20,000 to 100,000.

In a preferred embodiment of the present invention, the polyamide may have a linear, branched, hyperbranched, or dendritic structure.

In addition, the present invention provides a parts material selected from the group consisting of a vehicle material, an electronic device material, an industrial pipe material, a construction engineering material, a 3D printer material, a textile material, a cladding material, a machine tool material, a medical material, an aviation material, a photovoltaic material, a battery material, a sports material, a household appliance material, a household material, and a cosmetic material, which each include the polyamide.

In a specific example, a product including the parts material may be vehicle air ducts, plastic/rubber compounds, adhesives, lights, polymer optical fibers, fuel filter caps, line systems, cables for electronic devices, reflectors, sheaths of cables, optical fibers, wire protection tubes, control units, pipe tubes, liners, pipe coatings, oilfield exploration hoses, 3D printers, multifilaments, spray hoses, valves, ducts, pulps, gears, medical catheters, flame retardants for aircraft, solar cell protection plates, cosmetic materials, high hardness films, ski boots, headsets, glasses frames, toothbrushes, water bottles, or outsoles, but the present invention is not limited thereto.

Advantageous Effects of Disclosure

As described above, the present invention provides a method for producing a polyamide with controlled activator addition, and a polyamide produced thereby, the method allowing a polymerization conversion rate and a polydispersity index (PDI) to be enhanced by controlling the addition of an activator so as to prevent a gelation phenomenon that occurs during anionic polymerization.

The present invention is an eco-friendly processing method that does not generate by-products and does not use a solvent as a catalyst and has an effect that enables polymerization to a uniform molecular weight with a high conversion rate in a short polymerization reaction time at a low temperature, compared with an existing polymerization method.

The present invention also has an effect that a polymerization time is short and bulk polymerization is enabled, thereby greatly improving productivity through continuous processing, greatly increasing the efficiency of a manufacturing process, and greatly reducing manufacturing costs.

BEST MODE

Figure 1:
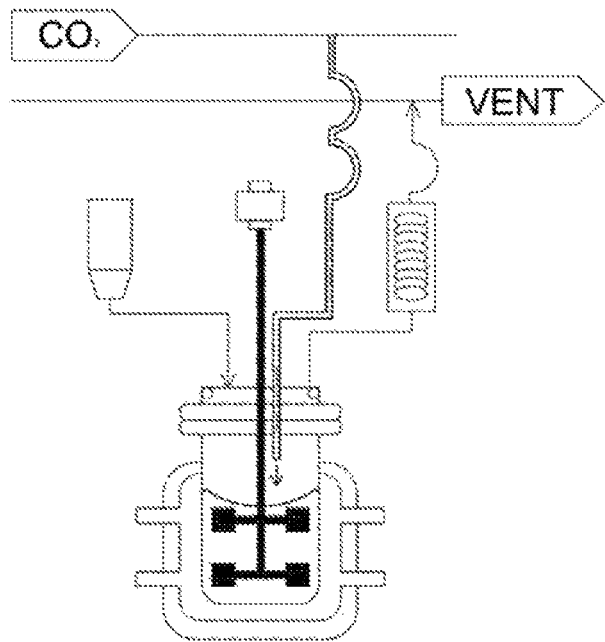
FIGS. 1 to 3 are configuration diagrams showing activator addition of a method for producing a polyamide with controlled activator addition according to the present invention.

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment.

Therefore, the following detailed description is not to be taken in a limiting sense, and the scope of the present invention is to be limited only by the appended claims and the entire scope of equivalents thereof, if properly explained.

In addition, unless otherwise specified in the present specification, the term "substitution" or "substituted" means that one or more hydrogen atoms in the functional groups of the present invention are substituted with one or more substituents selected from the group consisting of a halogen atom (—F, —Cl, —Br, or —I), a hydroxy group, a nitro group, a cyano group, an amino group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group. These substituents may be linked to each other to form a ring.

In the present invention, unless otherwise specified, the term "substituted" means that a hydrogen atom is substituted with a substituent such as a halogen atom, a $C_1$-$C_{20}$ hydrocarbon group, a $C_1$-$C_{20}$ alkoxy group, and a $C_6$-$C_{20}$ aryloxy group.

In addition, unless otherwise specified, the term "hydrocarbon group" refers to a linear, branched, or cyclic saturated or unsaturated hydrocarbon group. The alkyl group, the alkenyl group, the alkynyl group, and the like may be linear, branched, or cyclic.

In addition, unless otherwise specified in the present specification, the term "alkyl group" refers to a $C_1$-$C_{30}$ alkyl group and the term "aryl group" refers to a $C_6$-$C_{30}$ aryl group. In the present specification, the term "heterocyclic group" refers to a group in which one to three heteroatoms selected from the group consisting of O, S, N, P, Si, and any combination thereof are contained in one ring. Examples of the heterocyclic group may include pyridine, thiophene, and pyrazine, but the present invention is not limited thereto.

Hereinafter, embodiments of the present invention will be described with reference to the accompanying drawings, so that those of ordinary skill in the art can easily carry out the present invention.

As described above, in the conventional anionic polymerization, there is a problem that a gelation phenomenon occurs during a process of adding an activator in anionic polymerization, and there is a limitation in improving a polymerization conversion rate and a polydispersity index (PDI).

The present invention provides a method for producing a polyamide with controlled activator addition by an anionic polymerization reaction, wherein lactam, and based on 100 parts by weight of the entire lactam, 0.01 parts by weight to 20 parts by weight of an alkali metal as an initiator, 0.3 parts by weight to 10 parts by weight of a molecular weight controller, and 0.002 parts by weight to 7.0 part by weight of an activator are included, and the activator is added by adjusting the amount of addition at least twice at certain time intervals, thereby providing the solution to the above-described problems.

Specifically, according to the present invention, the activator may be added at least twice at intervals of 1 minute to 10 minutes. Preferably, the activator may be added at least twice at intervals of 3 minutes to 7 minutes.

Figure 2:
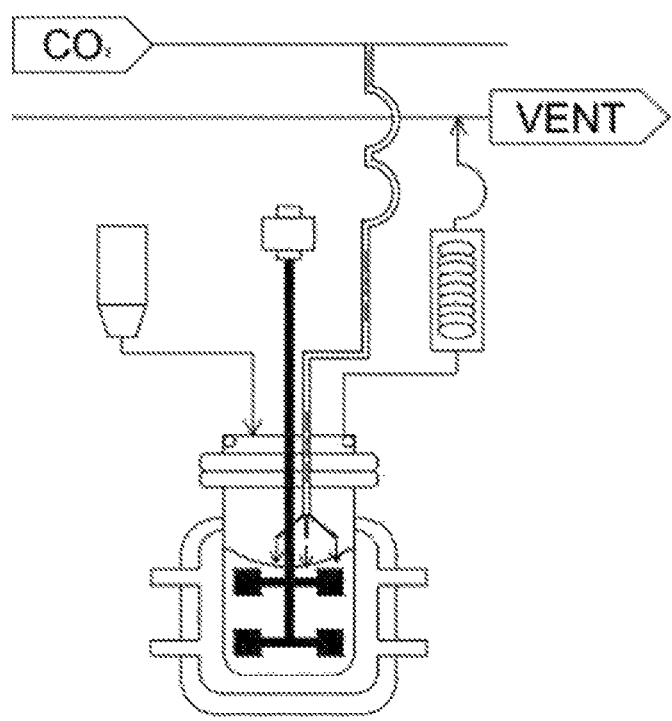
Figure 3:
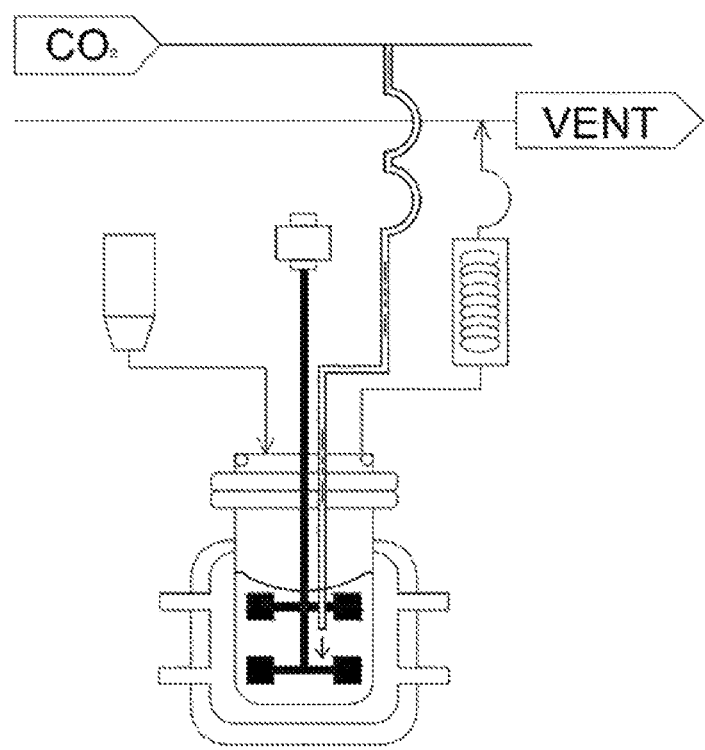

In this regard, FIGS. 1 to 3 schematically show a state in which carbon dioxide is added as the activator to a polymer for producing a polyamide 12 according to the present invention.

As shown in FIG. 1, a gelation phenomenon is prevented by injecting the carbon dioxide as the activator into the surface of the polymer at least twice at intervals of 5 minutes in a one-line manner, thereby improving a polymerization conversion rate and a polydispersity index (PDI).

In addition, according to the present invention, as shown in FIG. 2, the carbon dioxide may be injected as the activator by spraying the carbon dioxide at least twice at intervals of 5 minutes in a sparger manner.

In some cases, as shown in FIG. 3, the carbon dioxide may be directly injected as the activator into the polymer at least twice at intervals of 5 minutes in a one-line manner.

In this case, according to the present invention, when the number of times of addition of the activator is less than twice, the PDI may increase. Therefore, it is preferable to add the activator at least twice.

In addition, according to the present invention, the addition rate of the activator may be within a range of 0.001 L/min to 10 L/min with respect to the volume (1 $m^3$) of the reactor.

Therefore, the activator may be more efficiently sprayed onto the polymer to improve polymerization efficiency and fundamentally prevent the gelation phenomenon.

Specifically, compositions included in the production of the polyamide by the anionic ring-opening polymerization according to the present invention will be described below.

The laurolactam according to the present invention may be preferably used as a monomer for producing the polyamide. However, the present invention is not limited thereto. For example, the laurolactam may include caprolactam, piperidone, pyrrolidone, enantolactam, and caprylactam. In some cases, the lactam may include propiolactam, 2-pyrrolidone, valerolactam, caprolactam, heptanolactam, octanolactam, nonanolactam, decanolactam, undecanolactam, and dodecanolactam.

In addition, the alkali metal catalyst according to the present invention is an initiator for producing the polyamide and may include at least one selected from the group consisting of metal hydride, metal hydroxide, and metal alkoxide as a compound that allows the formation of the lactam anion.

In a specific example, the metal hydride may include sodium hydride and potassium hydride, the metal hydroxide may include sodium hydroxide and potassium hydroxide, and the metal alkoxide may include potassium tetra-butoxide and aluminum isopropoxide, but the present invention is not limited thereto.

The metal alkoxide may include sodium caprolactamate or potassium caprolactamate, alkaline earth metal caprolactamate, for example, magnesium bromide caprolactamate, magnesium chloride caprolactamate, or magnesium biscaprolactamate, an alkali metal, for example, sodium or potassium, alkali metal base, for example, sodium base, for example sodium hydride, sodium, sodium hydroxide, sodium methanolate, sodium ethanolate, sodium propanolate, or sodium butanolate, or at least one selected from the group consisting of potassium base, for example potassium hydride, potassium, potassium hydroxide, potassium methanolate, potassium ethanolate, potassium propanolate, potassium butanolate, or any mixture thereof, preferably at least one selected from the group consisting of sodium caprolactate, potassium caprolactate, magnesium bromide caprolactate, magnesium chloride caprolactate, magnesium biscaprolactate, sodium hydride, sodium, sodium hydroxide, sodium ethanolate, sodium methanolate, sodium propanolate, sodium butanolate, potassium hydride, potassium, potassium hydroxide, potassium methanolate, potassium ethanolate, potassium propanolate, potassium butanolate, and an) mixture thereof. In addition, at least one selected from the group consisting of sodium hydride, sodium, sodium caprolactamate, and any mixture thereof may be included.

The metal catalyst may be used in the form of a solid or a solution, and the catalyst is preferably used in the form of a solid. The catalyst is preferably added to a laurolactam melt in which the catalyst can be dissolved. These catalysts lead to particularly rapid reactions, thereby increasing the efficiency of the process for producing the polyamide according to the present invention.

According to the present invention, an amount of the alkali metal catalyst may be in a range of 0.01 parts by weight to 20 parts by weight based on 100 parts by weight of the entire lactam. The amount of the alkali metal catalyst may be in a range of preferably 0.03 parts by weight to 10 parts by weight, and more preferably 0.05 parts by weight to 5 parts by weight.

In this case, when the alkali metal catalyst is added in an amount of less than 0.01 parts by weight, unpolymerization may occur or a reaction rate may decrease. When the amount of the alkali metal catalyst exceeds 20 parts by weight, a low-molecular-weight polymer may be generated. Therefore, the above range is preferable.

Next, the molecular weight controller according to the present invention may be preferably ethylene-bis-stearamide (EBS), but the present invention is not limited thereto. The molecular weight controller may include at least one selected from the group consisting of an amine compound, a urea compound, and a di-urea compound.

According to the present invention, an amount of the molecular weight controller may be in a range of 0.3 parts by weight to 10 parts by weight based on 100 parts by weight of the entire lactam. The amount of the alkali metal catalyst may be in a range of preferably 0.4 parts by weight to 7 parts by weight, and more preferably 0.5 parts by weight to 3 parts by weight.

In this case, when the molecular weight controller is added in an amount of less than 0.3 parts by weight, a gelation problem may occur. When the amount of the molecular weight controller exceeds 10 parts by weight, a low-molecular-weight polymer may be generated. Therefore, the above range is preferable.

Finally, according to the invention, the activator may preferably be carbon dioxide ($CO_2$), but the present invention is not limited thereto. For example, the activator may include at least one selected from the group consisting of benzoyl chloride, N-acetyl caprolactam, N-acetyl laurolactam, octadecyl isocyanate (SIC), toluene diisocyanate (TDI), hexamethylene diisocyanate (HDI), and any mixture thereof.

According to the present invention, an amount of the activator may be in a range of 0.002 parts by weight to 7.0 part by weight based on 100 parts by weight of the entire lactam. The amount of the activator may be in a range of preferably 0.005 parts by weight to 5.0 parts by weight, and more preferably 0.01 parts by weight to 1.0 parts by weight.

In this case, when the activator is added in an amount of less than 0.002 parts by weight, a low-molecular-weight polymer may be produced by unpolymerization or a reaction rate may decrease. When the amount of the activator exceeds 7.0 part by weight, a gelation problem may occur or a low-molecular-weight polymer may be produced. Therefore, the above range is preferable.

Hereinafter, preferred examples are presented so as to help the understanding of the present invention. However, the following examples are for illustrative purposes only and the present invention is not limited by the following examples.

EXAMPLES

Example 1

Production of Polyamide 12 Through Addition of Carbon Dioxide

In order to remove moisture from a flask, a vacuum was released from the flask that was maintained at 80° C. in a vacuum state. 15 g of laurolactam, 0.12 g of EBS, and 0.03 g of NaH were added to the flask and molten at 165° C. in a nitrogen atmosphere. Thereafter, after the temperature was raised to 230° C. and 1 ml of carbon dioxide was injected into the upper end of the solution and reacted.

After 5 minutes, 1 ml of carbon dioxide was additionally injected. After 10 minutes, an aqueous formic acid solution (formic acid:distilled water=1:1) was added to the flask to terminate the reaction. The polyamide 12 samples having contents shown in Table 1 were collected. Using this, a molecular weight and a polydispersity index (PDI) were confirmed and the results thereof are shown in Table 3 below.

TABLE 1

|  | Lactam (g) | Alkali metal (g) | Molecular weight controller (g) | Content of $CO_2$ (ml) | Addition method |
| --- | --- | --- | --- | --- | --- |
| Example 1 | 15 | 0.03 | 0.12 | 2(1 + 1) | Twice |
| Example 2 | 15 | 0.03 | 0.12 | 20(10 + 10) | Twice |
| Example 3 | 15 | 0.03 | 0.12 | 3(1 + 1 + 1) | Three times |
| Example 4 | 15 | 0.03 | 0.12 | 2(1 + 1) | Sparger surface addition (twice) |
| Example 5 | 15 | 0.03 | 0.12 | 2(1 + 1) | one-line internal addition (twice) |

TABLE 1-continued

| | Lactam (g) | Alkali metal (g) | Molecular weight controller (g) | Content of $CO_2$ (ml) | Addition method |
|---|---|---|---|---|---|
| Example 6 | 15 | 0.03 | 0.12 | 2(1 + 1) | Addition after decompression inside reactor (0.9 bar) |
| Comparative Example 1 | 15 | 0.03 | 0.12 | 20 | One time |
| Comparative Example 2 | 15 | 0.03 | 0.12 | 1000(500 + 500) | Twice |

Example 2

A polyamide 12 sample was produced in the same manner as in Example 1, except that 10 ml of carbon dioxide was injected twice at intervals of 5 minutes.

Example 3

A polyamide 12 sample was produced in the same manner as in Example 1, except that 1 ml of carbon dioxide was injected three times at intervals of 5 minutes.

Example 4

A polyamide 12 sample was produced in the same manner as in Example 1, except that carbon dioxide was injected using sparger.

Example 5

A polyamide 12 sample was produced in the same manner as in Example 1, except that carbon dioxide was injected into a solution by using one-line.

Example 6

A polyamide 12 sample was produced in the same manner as in Example 1, except that an internal pressure of a reactor was lowered to 0.9 bar and carbon dioxide was injected into a solution by using one-line. The reaction was terminated after 35 minutes.

Example 7

In order to remove moisture from a flask, a vacuum was released from the flask that was maintained at 80° C. in a vacuum state. 3.5 kg of laurolactam, 26 g of EBS, and 7.1 g of NaH were added to the flask and molten at 165° C. in a nitrogen atmosphere. Thereafter, after the temperature was raised to 230° C. and carbon dioxide was injected into the upper end of the solution at a rate of 300 ml/min for 2 minutes and reacted.

After 35 minutes, the reaction was terminated and polyamide 12 samples having contents shown in Table 2 were collected. Using this, a molecular weight and a polydispersity index (PDI) were confirmed and the results thereof are shown in Table 4 below.

Example 8

A polyamide 12 sample having a content shown in Table 2 was produced in the same manner as in Example 7, except that carbon dioxide was injected at the upper end of the solution at a rate of 800 ml/min for 45 seconds. After 13 minutes, the reaction was terminated.

TABLE 2

| | Lactam (kg) | Alkali metal (g) | Molecular weight controller (g) | Content of $CO_2$ (ml) | $CO_2$ Injection rate |
|---|---|---|---|---|---|
| Example 7 | 3.5 | 7.1 | 26 | 600 | 300 ml/min |
| Example 8 | 3.5 | 7.1 | 26 | 600 | 800 ml/min |

Examples 9 and 10

A polyamide 12 sample was produced in the same manner as in Example 1, except that N-acetylcaprolactam (NAC) was injected instead of carbon dioxide and it was adjusted to include conditions shown in Table 3.

TABLE 3

| | Lactam (g) | Alkali metal (g) | Molecular Weight controller (g) | Content of NAC (ml) | Polymerization temperature (° C.) |
|---|---|---|---|---|---|
| Example 9 | 20 | 0.12 | 0.24 | 0.80(0.4 + 0.4) | 230 |
| Example 10 | 20 | 0.12 | 0.14 | 0.80(0.4 + 0.4) | 180 |

COMPARATIVE EXAMPLES

Comparative Example 1

A polyamide 12 sample was produced in the same manner as in Example 1, except that 20 ml of carbon dioxide was injected at one time.

Comparative Example 2

A polyamide 12 sample was produced in the same manner as in Example 1, except that 500 ml of carbon dioxide was injected twice at intervals of 5 minutes.

TABLE 4

| | Molecular weight (g/mol) | Polydispersity index (PDI) | Polymerization |
|---|---|---|---|
| Example 1 | 68,900 | 2.3 | Polymerization |
| Example 2 | 79,500 | 2.4 | Polymerization |
| Example 3 | 68,500 | 2.3 | Polymerization |

TABLE 4-continued

| | Molecular weight (g/mol) | Polydispersity index (PDI) | Polymerization |
|---|---|---|---|
| Example 4 | 67,400 | 2.2 | Polymerization |
| Example 5 | 66,900 | 2.2 | Polymerization |
| Example 6 | 61,500 | 2.3 | Polymerization |
| Example 9 | 85,000 | 2.5 | Polymerization |
| Example 10 | 93,000 | 2.4 | Polymerization |
| Comparative Example 1 | 120,000 | 3.7 | Gelation |
| Comparative Example 2 | 160,000 | 4.1 | Gelation |

As shown in Table 4, Comparative Example 1 in which 20 ml of carbon dioxide was injected as an activator at one time showed a high molecular weight and a wide molecular weight distribution outside a target range, compared with Example 1, and Comparative Example 2 in which 500 ml of carbon dioxide was injected twice at intervals of 5 minutes showed a very high molecular weight and a wide molecular weight distribution outside a target range, compared with Example 1.

TABLE 5

| | Molecular weight (g/mol) | Polydispersity index (PDI) | Polymerization time (min) |
|---|---|---|---|
| Example 7 | 61,500 | 2.3 | 35 |
| Example 8 | 67,500 | 2.3 | 13 |

As shown in Table 5, it was confirmed that Example 8, which had a relatively fast carbon dioxide injection rate compared with Example 7, had a short polymerization time and a large molecular weight.

Although the present invention has been described with reference to the drawings according to embodiments of the present invention, it will be understood by those of ordinary skill in the art that various applications and modifications can be made thereto without departing from the scope of the present invention.

The invention claimed is:

1. A method for producing a polyamide with controlled activator addition through an anionic polymerization reaction, the method comprising polymerizing a lactam in the presence of, based on 100 parts by weight of the entire lactam, 0.01 parts by weight to 20 parts by weight of an alkali metal catalyst as an initiator, 0.3 parts by weight to 10 parts by weight of a molecular weight controller, and 0.01 parts by weight to 1.0 part by weight of an activator,
   wherein the activator is injected by adjusting an addition amount at an interval of at least twice,
   wherein an addition interval of the activator is within 1 minute to 10 minutes,
   wherein the method does not use a separate solvent, and
   wherein the activator is carbon dioxide ($CO_2$).

2. The method of claim 1, wherein an addition rate of the activator is within a range of 0.001 L/min to 10 L/min with respect to a volume (1 $m^3$) of a reactor.

3. The method of claim 1, wherein the activator is injected in a spraying method using a sparger.

4. The method of claim 1, wherein the activator is injected into a polymer.

5. The method of claim 1, wherein the alkali metal catalyst comprises one or more selected from the group consisting of metal hydride, metal hydroxide, and metal alkoxide.

6. The method of claim 1, wherein the polymerization reaction is performed within a range of 0.5 minutes to 120 minutes.

7. The method of claim 1, wherein the lactam in the polymerization reaction has a conversion rate of 95% or more.

8. The method of claim 1, wherein the polymerization reaction is performed within a range of 180° C. to 300° C.

9. A polyamide produced by the method of claim 1.

10. The polyamide of claim 9, wherein the polyamide has a polydispersity index (PDI) of 3.0 or less.

11. The polyamide of claim 9, wherein a weight average molecular weight (Mw) of the polyamide is in a range of 20,000 to 100,000.

12. The polyamide of claim 9, wherein the polyamide has a linear, branched, hyperbranched, or dendritic structure.

13. A parts material selected from the group consisting of a vehicle material, an electronic device material, an industrial pipe material, a construction engineering material, a 3D printer material, a textile material, a cladding material, a machine tool material, a medical material, an aviation material, a photovoltaic material, a battery material, a sports material, a household appliance material, a household material, and a cosmetic material, which each include the polyamide of claim 9.

* * * * *